United States Patent
Rosenthal et al.

(10) Patent No.: US 11,724,461 B2
(45) Date of Patent: Aug. 15, 2023

(54) PRESSING TOOL, SYSTEM AND METHOD FOR PRODUCING A TIGHT CONNECTION OF A PRESS CONNECTOR TO A WORKPIECE

(71) Applicant: Viega Technology GmbH & Co. KG, Attendorn (DE)

(72) Inventors: Jörg Rosenthal, Reichshof-Eckenhagen (DE); Nico Schellenberg, Olpe (DE); Uwe Grünkemeier, Kaarst (DE)

(73) Assignee: Viega Technology GmbH & Co. KG, Attendorn (DE)

(*) Notice: Subject to any disclaimer, the term of this patent is extended or adjusted under 35 U.S.C. 154(b) by 0 days.

(21) Appl. No.: 17/760,688

(22) PCT Filed: Sep. 2, 2020

(86) PCT No.: PCT/EP2020/074394
§ 371 (c)(1),
(2) Date: Mar. 15, 2022

(87) PCT Pub. No.: WO2021/052751
PCT Pub. Date: Mar. 25, 2021

(65) Prior Publication Data
US 2022/0388253 A1 Dec. 8, 2022

(30) Foreign Application Priority Data
Sep. 16, 2019 (DE) .................. 10 2019 124 845.0

(51) Int. Cl.
*B29C 65/56* (2006.01)
*B29C 65/00* (2006.01)
*B29L 23/00* (2006.01)

(52) U.S. Cl.
CPC ........ *B29C 65/565* (2013.01); *B29C 66/1142* (2013.01); *B29C 66/5221* (2013.01);
(Continued)

(58) Field of Classification Search
CPC .............. B29C 65/565; B29C 66/1142; B29C 66/5221; B29C 66/8242; B29C 66/84; B29L 2023/22; B25B 25/005; B25B 27/10
See application file for complete search history.

(56) References Cited

U.S. PATENT DOCUMENTS

| 2,921,438 A | 1/1960 | Klingler et al. |
| 3,662,450 A | 5/1972 | Kish et al. |

(Continued)

FOREIGN PATENT DOCUMENTS

| DE | 2118782 | 11/1971 |
| DE | 4446502 A1 | 12/1995 |

(Continued)

*Primary Examiner* — Ryan J. Walters
(74) *Attorney, Agent, or Firm* — The Webb Law Firm

(57) ABSTRACT

The invention relates to a system for producing a sealed connection of a press connector to a workpiece, in particular to a pipe, preferably to a plastic pipe, with a pressing tool for pressing a press connector and with a pressure tool for driving the pressing tool. The pressure tool is arranged to output a hydraulic pressure at a pressure generation point The pressing tool is arranged to receive a hydraulic pressure at a pressing location and to press a press connector accordingly. The pressure tool and the pressing tool are connected via a hydraulic pressure transmission connection, the pressure generation location and the pressing location being remote from each other. A corresponding method for producing a tight connection of a press connector to a workpiece, in particular to a pipe made of a flexible material, preferably a plastic pipe, as well as a press force translator and a press tool are also described.

21 Claims, 11 Drawing Sheets

(52) U.S. Cl.
CPC .......... *B29C 66/8242* (2013.01); *B29C 66/84* (2013.01); *B29L 2023/22* (2013.01)

(56) References Cited

U.S. PATENT DOCUMENTS

| | | |
|---|---|---|
| 6,405,411 B1 | 6/2002 | Allemann et al. |
| 6,799,448 B2 | 10/2004 | Meier |
| 8,782,863 B2 * | 7/2014 | Pfeiffer .................. B25B 27/10 29/272 |
| 11,213,938 B2 * | 1/2022 | Ruch ...................... B25B 27/026 |
| 2012/0284981 A1 | 11/2012 | Bungter et al. |
| 2013/0174395 A1 | 7/2013 | Kim |
| 2017/0087709 A1 | 3/2017 | Barezzani |
| 2017/0252912 A1 | 9/2017 | Barezzani |
| 2021/0129310 A1 | 5/2021 | Barezzani |

FOREIGN PATENT DOCUMENTS

| | | |
|---|---|---|
| DE | 102008057424 A1 | 5/2010 |
| DE | 202009015515 U1 | 4/2011 |
| EP | 2186606 A2 | 5/2010 |
| EP | 3213881 A1 | 9/2017 |
| WO | 9943473 A1 | 9/1999 |
| WO | 2018189706 A1 | 10/2018 |

* cited by examiner

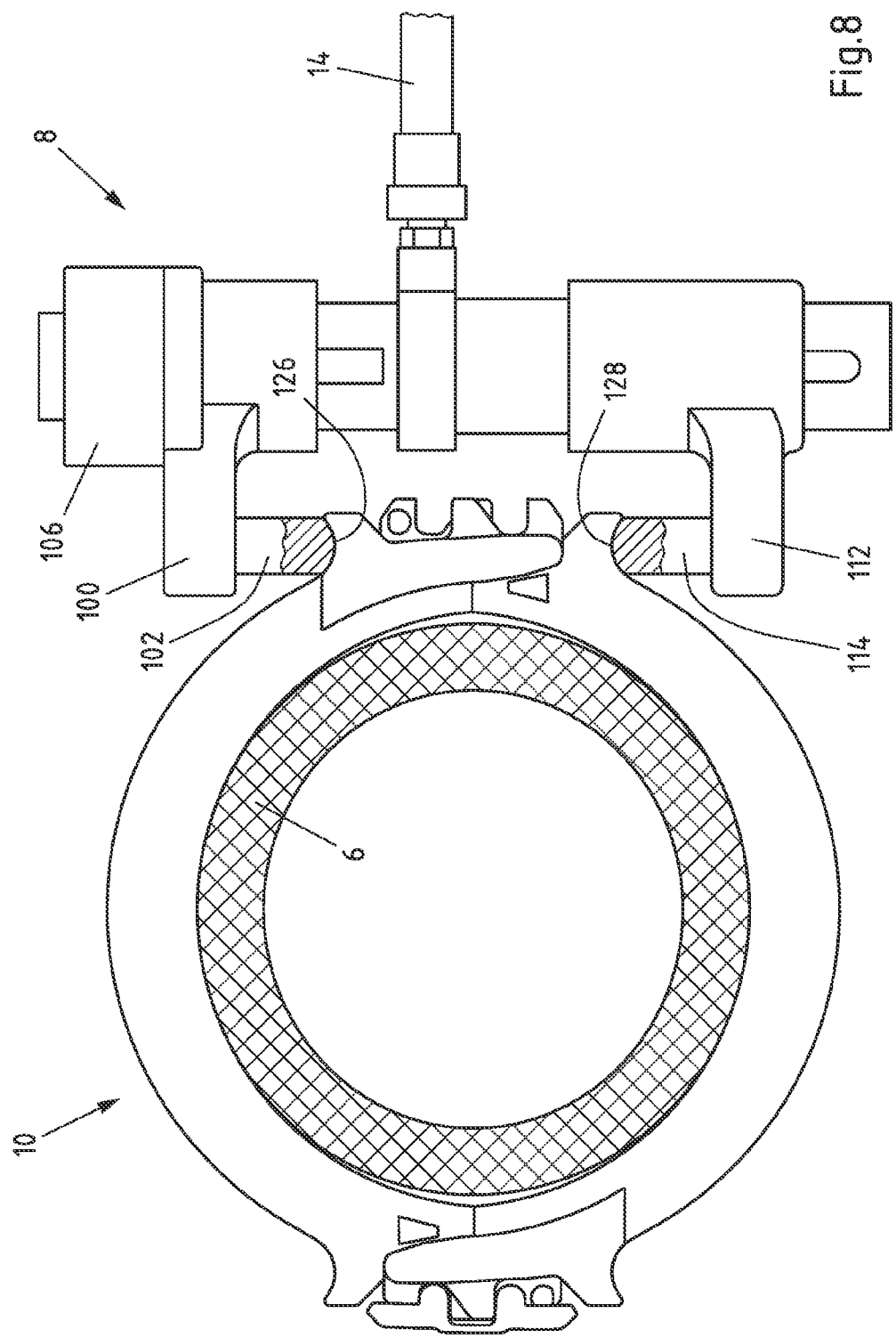

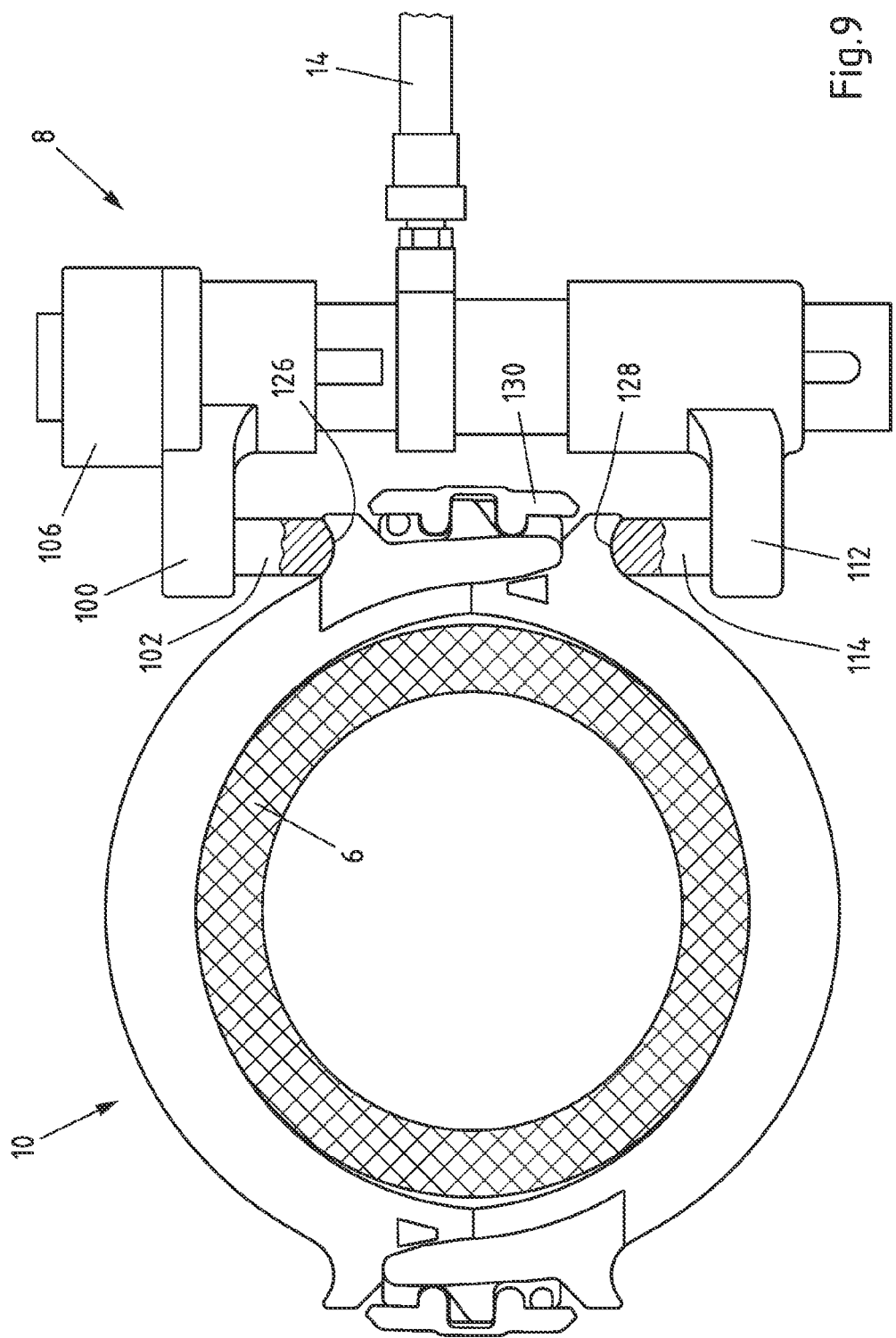

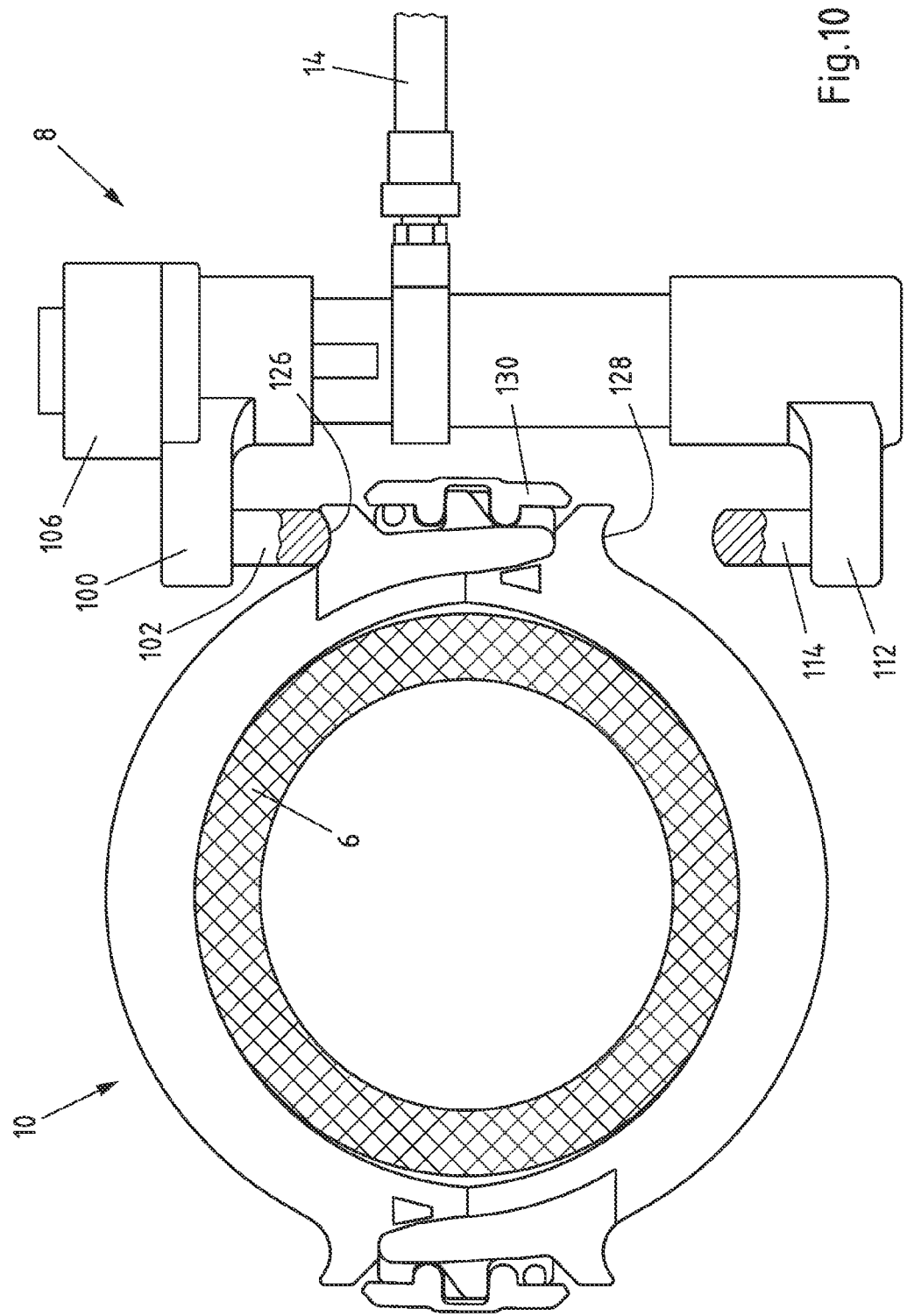

PRESSING TOOL, SYSTEM AND METHOD FOR PRODUCING A TIGHT CONNECTION OF A PRESS CONNECTOR TO A WORKPIECE

CROSS-REFERENCE TO RELATED APPLICATIONS

This application is the United States national phase of International Application No. PCT/EP2020/074394 filed Sep. 2, 2020, and claims priority to German Patent Application No. 10 2019 124 845.0 filed Sep. 16, 2019, the disclosures of which are hereby incorporated by reference in their entirety.

BACKGROUND OF THE INVENTION

Field of the Invention

The invention relates to a system for producing a tight connection of a press connector to a workpiece, in particular to a pipe, preferably to a plastic pipe, with a pressing tool for pressing a press connector and with a pressure tool for driving the pressing tool, wherein the pressure tool is arranged to output a hydraulic pressure at a pressure generation location, wherein the pressing tool is arranged to receive a hydraulic pressure at a pressing location and to press a press connector accordingly, and wherein the pressure tool and the pressing tool are connected via a hydraulic pressure transmission connection and wherein the pressure generation point and the injection point being remote from each other, The invention further relates to a press tool for pressing a press connector and a method for producing a tight connection of a press connector to a workpiece.

Description of Related Art

Several methods are known to connect supply lines. Examples are mirror welding, connecting via a threaded joint and a threaded connector, connecting by means of electrofusion sockets and connecting by means of a threaded compression connector.

In mirror welding, the interface between two workpieces to be joined is usually prepared in an elaborate manner. For this purpose, the outer layer of a pipe end to be joined made of polyethylene (PE) is peeled off to remove a supposed oxidation of an outer layer of the pipe. Then a flat surface at the head and the peeled-off surface are washed off with a PE cleaner containing alcohol. Only then can the joint be created by the mirror welder. In mirror welding, a heating element (mirror) is placed on the flat surfaces of the pipe ends to be joined. The heating of the heating element plasticises the plastic of the pipe ends to be joined. With the help of a joining pressure, the pipe ends are pressed against each other so that the pipe ends are welded together as a result.

Several problems can arise when applying the joining pressure. On the one hand, the flat surface must be produced squarely, smoothly and cleanly. On the other hand, the pipes lying in front of each other must not have any angular errors. At the same time, the offset of the pipe ends should be less than about 10% of the pipe wall thickness. If necessary, the wall thicknesses in the weld area should be adjusted by cutting. Another disadvantage of mirror welding is the long time it takes to adjust the pipe ends. When aligning, heating, repositioning, joining and cooling take place, whereby each step means an extension of the time required for the entire process. In addition, special welding qualifications are often required from the user in order to carry out high-quality mirror welding.

When using a threaded connection with a threaded connector, a thread is cut on the outer surface of the pipe end to be connected by means of a thread cutting device, which is then connected with a threaded connector. The disadvantages of this method are on the one hand the high time expenditure due to the cutting process and on the other hand the complex connection with the connector. In addition, more space is often needed due to the rotational movement that brings about a threaded connection.

When using electrofusion sockets, the outer skin of a PE pipe to be joined is peeled off and washed off with a PE cleaner, as in mirror welding. In contrast to mirror welding, a fitting with an integrated welding collar is pushed onto the end of the pipe in this process. After the fitting has been attached, the effects of supposed external forces on the socket must be avoided. For this reason, a fixing device is often used. After everything has been brought into position, a welding device is connected by means of a cable and the welding process can begin. As with mirror welding, there is a warm-up, holding and cooling time for electrofusion sockets. In contrast to mirror welding, however, there is no need to press the two flat surfaces against each other by exerting a joining force. This has the advantage that the formation of a bead on the outside or inside of the PE pipe is avoided.

When connecting by means of a threaded press connector, a press connector is connected to a fitting (T-piece, socket, etc.), which has at least one connection point, and to a nut, which has one sealing element per connection point. For this purpose, the nut is first pushed onto a PE pipe to be connected. Then the pipe together with the nut is pushed into the moulded part and screwed together with the nut. While the nut is screwed onto the moulded part, the respective sealing element is pressed onto the pipe surface via a cone and thus seals the connection. The problem with this connection is that the known threaded press connectors are available up to a certain size or diameter, so that they cannot be used to connect a pipe end with a larger diameter. Furthermore, this type of connection leads to higher costs, especially due to the connector, compared to mirror welding or compared to the use of electrofusion sockets.

Supply lines are often buried in the ground, so that their assembly or the connection of several line sections must be carried out in deep places. The installation depth for large supply lines is usually approx. 1 m. Usually the user stands in the pit to connect several sections of the supply line, so that the connection is made under confined conditions.

US 2017/0087709 A1 discloses a pressing tool for pressing joints in pipelines, with a pressing tool connected via a line to an electric motor.

DE 21 18 782 A discloses a device for ensuring a homogeneous connection of pipes over the circumference of a pipe, which is used with a manual, portable pump.

DE 44 46 502 A1 discloses a hand tool with a built-in hydraulic drive, which is connected to an electrically driven hydraulic pump via a pressure hose.

EP 2 186 606 A2 discloses an attachment for a pipe pressing machine, wherein a handpiece with pressing jaws is connected to the pipe pressing machine via a flexible line.

SUMMARY OF THE INVENTION

Therefore, the present invention is based on the object of simplifying the joining of workpieces, for example plastic pipe ends, and making it more cost-effective and time-saving. In particular, the present invention is based on the object of providing tools and a method that simplify the joining of workpieces with large diameters in places that are difficult to access.

This object is solved with a system of the afore mentioned type, which is characterised in that the pressing tool comprises at least two opposing pressing sections with a variable distance to each other and a pretensioning element, and that the pressing tool is arranged to take at least three states, wherein in a first state the pretensioning element is tightened and the pressing sections are spaced apart, wherein, in a second state, the pressing sections are tightened by relaxing the pretensioning member into engagement with a press connector, and wherein in a third state the press sections exert a lifting force towards each other on the press connector and that, in the second state, the press connector is connected in a twist-proof manner to a workpiece to be connected.

By using the system according to the invention, pressing by the pressing tool can be carried out in a space-saving manner in locations that are difficult to access and the operation or driving of the pressing tool by the pressing tool can be carried out from a more user-friendly, practical and easily accessible location. For example, when pressing a press connector in a pit, a user can be outside the pit during pressing.

When pressing a press connector using the system, a small axial offset of pipes to be connected or a deviation in their concentricity are less problematic than, for example, when connecting by welding.

In addition, a simple and inexpensive instruction of a user is sufficient for the use of the system compared to known connection methods.

The workpiece may be a section of a supply or disposal pipe. In particular, the system can be used to connect pipe ends, the respective diameter of the pipes being designed according to standards for pipes for e.g. residential and/or commercial construction.

The system has a pressure tool for driving the pressing tool. The pressing tool is preferably designed as a mobile unit, for example as a portable unit, as a unit equipped with rollers or as a hand tool. Alternatively or additionally, the pressure tool can be designed to drive several further tools or pressing tools. For this purpose, the pressure tool preferably comprises a pressure chamber and a pump plunger for compressing a medium such as oil. Preferably, the pressure generation location is accordingly the location where the pressure tool is located when it is capable of outputting a hydraulic pressure.

A chamber and a pump plunger are preferably provided as the translation means for translating a received lifting force into a hydraulic pressure, wherein the pump plunger can be driven by a lifting force from a pressing hand tool and can thus press a medium, for example oil, arranged in the chamber.

The pressing tool is arranged for pressing a press connector. Preferably, the pressing tool comprises at least one pressing section, wherein the at least one pressing section is adapted to the shape of a press connector to be pressed. Preferably, the at least one pressing section may be interchangeable, if necessary, to be adapted to a particular press connector type or size. Alternatively or additionally, the pressing tool can be controlled to adapt a pressing distance to a press connector to be pressed. Preferably, the pressing tool is provided for pressing a press connector that is selected depending on a pipe diameter. Furthermore, the pressing tool is arranged to press a press connector at a pressing location on the basis of hydraulic pressure. The pressing location is understood to be the location at which the pressing tool presses a press connector.

The pressure tool and the pressing tool are connected via a hydraulic pressure transmission connection, which is arranged to transmit a hydraulic pressure from the pressure generation location to the pressing location. The pressure tool transmits the hydraulic pressure to the pressure transmission connection, which transmits it to the pressing tool, the pressure thus transmitted being used to drive the pressing tool for pressing a press connector. Preferably, the diameter of the pressure transmission connection is determined as a function of the diameter of the respective connecting pieces, so that the pressure loss is kept as low as possible when conducting a medium such as oil.

The distance between the pressure generation point and the grouting point preferably corresponds to a difference in position in height and/or horizontal distance.

A pipe connector or fitting for tight connection to a pipe end can be used as a press connector, which has a base body with a receptacle for a pipe end, wherein the base body has at least two shell elements along the circumference of the receptacle, wherein the shell elements have connecting sections at the circumferential ends, and wherein connecting means are provided which are arranged for connecting the shell elements at respective connecting sections assigned to one another. Furthermore, the press connector can have at least two mutually associated connecting sections with a profiled attachment area for pressing with a pressing tool, so that the shell elements can be brought into a pressed state. Furthermore, the connecting means for the connecting sections with the attachment area can be designed to fix the shell elements in the pressed state.

Preferably, at least one sealing element is provided on the inner wall of the press connector to seal a connection between the press connector and a workpiece to be connected. An O-ring can be used as a sealing element. For connecting two pipe ends, the press connector preferably has two O-rings, each of which seals a connection of the press connector with a pipe end.

In particular, the press connector can be designed for one-sided pressing or for multi-sided pressing. In the case of multi-sided pressing, preferably at least two outer circumferential sections are each designed as a press fit. At least one section of an outer wall of the press connector can also be designed as a press fit.

In a first embodiment of the system, the pressure transmission connection is at least partially formed from a flexible material. This allows the pressure for driving the pressing tool to be generated in a simple manner at a position remote from the place of use of the pressing tool. In particular, the position of the pressing tool or the pressure generation location can thus be relocated more flexibly and the system or its use can be designed to be more user-friendly.

Flexible materials can be, for example, composite materials with a core layer of braided fibres and with a sheathing of plastic or plastics reinforced with fibres. Preferably, the pressure transmission connection allows movement of the pressure tool relative to the pressing tool.

In a further embodiment of the system, that the pressure transmission connection comprises a hydraulic hose and that the hydraulic hose is connected to the pressure tool and to the pressing tool, in particular in each case via a flat-face connection. By using hydraulic hoses as well as flat-face connections, the system can be designed in a cost-effective and simple manner. Furthermore, flat-face connections are easy to handle.

In a further embodiment of the system, the pressure tool is designed as a hand tool with a press hand tool and with a press force translator, wherein the pressing hand tool is arranged to generate and transmit a lifting force at the pressing force translator and wherein the pressing force translator is arranged to translate a lifting force transmitted from the pressing hand tool into a hydraulic pressure and to output it. Due to the design of the pressing tool as a hand tool, the pressing tool can be easily operated, in particular compared to known welding methods.

The pressing hand tool may have a manual actuator and a ram, wherein actuation of the actuator causes or controls movement of the ram. The movement of the ram then generates a lifting force. The movement of the ram may be electrically operated, in particular by battery operation. The pressing hand tool may be in the form of a press gun or a portable, manually operable device. Preferably, the press hand tool and the press force translator are detachably connected to each other so that they are easy to transport, store or replace.

In the context of the present invention, lifting force is understood to be the force that causes or brings about a lift or movement in a straight line.

In a further embodiment of the system, the pressing tool is arranged to translate a pressure transmitted by the pressure transmission connection into a lifting force, and to press a press connector by exerting the lifting force. Thus, the pressing tool can be easily driven by hydraulics.

The pressing tool comprises at least two opposing pressing sections with a variable distance to each other and a pretensioning element, and that the pressing tool is arranged to take at least three states, wherein in a first state the pretensioning element is tightened and the pressing sections are spaced apart, wherein, in a second state, the pressing sections are tightened by relaxing the pretensioning member into engagement with a press connector, and wherein in a third state the press sections exert a lifting force towards each other on the press connector.

In the context of the present invention, it has been recognised that the pressing tool can first be positioned on the press connector and then pressed. In particular, the force from releasing the pretensioning element can be used to hold the pressing tool in engagement on the press connector before pressing takes place. By positioning the pressing tool in advance, it can be checked that the lifting force is later applied as intended or at the correct position, thus improving the prospects for the result of pressing. Furthermore, the user-friendliness of the system is increased by pre-tensioning the pressing tool.

Preferably, the press sections are axially movable in the direction towards or away from each other, whereby their movement enables the exertion of a lifting force. The variable distance between the press sections can correspond to the instantaneous distance between the closest points of the respective press sections. The press sections can have a shape that corresponds to the shape of a press connector or at least a part thereof, in particular of press seats. In this case, the press sections can be formed as pressure pieces, which then form a pair of pressure pieces. Bolt-like elements can be used as pressure pieces.

A compression spring or elastic element with a predetermined spring constant can be provided as a pretensioning element. Preferably, the pretensioning element is connected to at least one first pressing section and at least one second pressing section is fixed with respect to the base body of the pressing tool. Thus, when the pretensioning element is pretensioned, the first pressing section can be moved away from the second pressing section and when the pretensioning element is released, the first pressing section can be moved towards the second pressing section and thus a press connector can press against the second pressing section.

Thus, in the first state and in the second state, a tight connection has not yet been created. Only in the third state or after the third state has been reached is a tight connection made with the workpiece to be connected. In this way, the states of the pressing tool can be used to check whether pressing has already taken place or, if necessary, still has to be carried out in order to create a tight connection.

In the second state, the press connector is connected in a twist-proof manner to a workpiece to be connected. Accordingly, the press connector can be positioned in such a way that, when pressing in the third position, the lifting force can be safely exerted in an intended direction and thus the press connector can be pressed until a tight connection is achieved.

Preferably, the press connector has a cutting ring that penetrates the outer surface of a workpiece to be connected by pre-tensioning or by relaxing the pre-tensioning element of the press tool. For example, the cutting ring may have metal teeth that engage the shell of a PE pipe end in the second position.

After the pressing tool has assumed the third state and sufficient lifting force has been applied to a press connector to be pressed, a safety element can be attached to the press connector. This can ensure that the press connector remains in a pressed state. Preferably, the press connector and the pressing tool are designed in such a way that, in the third state of the pressing tool, the safety element can be attached without adjusting the pressing tool. For example, a safety element can be pushed axially past the pressing tool.

In a further embodiment of the system, the pressing tool is arranged to switch off when a limit value for the variable distance between the pressing sections of the pressing tool is reached. In this way, it can be avoided that too much force is exerted on a press connector to be pressed and thus destruction of the press connector or a connection to be made can be avoided.

Preferably, a distance is specified for a press connector to be pressed that corresponds to an intended pressed state of the press connector. Alternatively or additionally, the limit value for the pressing tool can correspond to a maximum lifting force to be exerted on a press connector or a maximum operating pressure in the pressing tool.

The press tool can be switched off by disconnecting a coupling between a press hand tool and a press force translator. The disconnection is preferably done by an internal control (pressure deactivation) of the press hand tool. Furthermore, the diameter of the pump ram in the press force translator is designed in such a way that the generated hydraulic operating pressure in the system is limited at a predetermined operating pressure value. For example, when using a press hand tool in the form of a press gun designed for 32 kN, the press gun switches off when a pressure of 32 kN is reached on the pump ram. Alternatively or additionally, a pressure limitation and thus an "overpressing" of a press connector can be avoided by specifying a maximum number of strokes to be exerted on the pump plunger.

Furthermore, the compression tool can have an indicator means that is arranged to indicate a shutdown. This can signal to a user that sufficient lifting force has been applied to a press connector and that the press connector is thus pressed.

Furthermore, a pressing force translator for translating a lifting force into a hydraulic pressure, in particular for use in a system for producing a tight connection with a workpiece, in particular with a pipe, preferably with a plastic pipe, with a housing, with a connecting portion for receiving a lifting force, with a connecting element for outputting a hydraulic pressure and with transmission means for converting a received lifting force into a hydraulic pressure may be provided, the connecting portion is adapted to be connected to a pressing hand tool, and that the connecting element is arranged for connection to a pressure transmission connection which is at least partially formed from flexible material, in particular is a flat-face connection.

A connection with a pressure transmission connection made of a flexible material enables a locally flexible use of the pressing force translator in relation to the pressing location. Furthermore, already available means can be used for the design of the press force translator according to the invention and the manufacturing costs can be kept low accordingly.

Preferably, the connection element is designed for a detachable connection so that the press force translator can be separated from a pressing tool and better stowed away when used in a system. Furthermore, this allows the press force translator to be used together with other pressure transmission connections.

Furthermore, the housing can be designed for use as an attachment for a hand tool and the connecting section for a detachable connection. In this way, the press force translator can be easily transported, stored or replaced. Furthermore, the press force translator or its housing can be designed as an interchangeable attachment and thus be used together with a press hand tool of a pressure tool designed for use with different attachments.

Furthermore, a valve element can be provided for releasing a pressure built up at the connection element in order to control the operating pressure or the pressure in the press force translator in a simple manner. In particular, when the pressing force translator is used together with a pressing tool, a pressure can be released in the pressing tool or in a pressure transmission connection between the pressing force translator and the pressing tool. Preferably, the valve element can be operated manually so that the pressure can be released easily and in a user-friendly manner when the press force translator is designed as an attachment for a hand tool.

According to the invention, the above-mentioned object is also solved by a pressing tool for pressing a press connector, in particular for use in a system for producing a sealed connection with a workpiece, in particular with a pipe, preferably with a plastic pipe, with a housing, with a connecting element for receiving a hydraulic pressure, with translation means for translating a received hydraulic pressure into a lifting force and with at least two pressing sections for pressing a press connector at a pressing location, wherein the connecting element is arranged for connection to a pressure transmission connection which is at least partially formed from flexible material, in particular is a flat-face connection, which is characterised in that a pretensioning element is provided for pretensioning the at least two pressing sections and that a pretensioning handle is provided for pretensioning the pretensioning element, wherein, when the pretensioning element is pretensioned, the first pressing section is moved away from the second pressing section and when the pretensioning element is released, the first pressing section is moved towards the second pressing section.

Here, too, a connection with a pressure transmission connection enables a locally flexible use of the pressing tool in relation to the pressure generation location. In particular, this allows pressure to be taken up at a pressing location remote from the generation location.

Preferably, the pressing tool comprises a chamber, a piston and at least one pressing section. In operation, a pressurised medium from the pressure transmission connection can enter the chamber through the connection member and cause movement of the piston, whereby the piston drives the at least one press section. As a result, the at least one pressing section can be moved linearly with a lifting force corresponding to the pressure received from the pressure transmission connection. When the at least one pressing section has been brought into contact with a press connector as intended, the pressing section can press the press connector by the lifting force with which it is driven.

A pretensioning element is provided for pretensioning the at least two pressing sections, and that a pretensioning handle is provided for pretensioning the pretensioning element. By means of the pretensioning handle, the pretensioning element of the pressing tool can be manually tensioned and/or released and thus the pressing tool can be used easily. Preferably, the pre-tensioning handle can be operated with one hand, so that pre-tensioning of the pressing tool in a difficult-to-access location is simplified. Preferably, the pre-tensioning handle is designed as a transport handle so that the pressing tool can be easily transported and made more compact.

In a further embodiment of the pressing tool, the at least two pressing sections are designed for lateral engagement with a press connector. By means of a lateral engagement, a pressing tool with small dimensions, in particular with a small pressing distance between the pressing sections, can be used to press workpieces with large diameters. Furthermore, a lateral engagement with a press connector allows the press tool to be used more easily if the workpiece to be connected or the press connector is located in a place with limited space, in particular in a pit or between structures.

Preferably, the press connector to be pressed has at least two shell elements which are pivotably connected to each other and are designed to enclose an interface between two workpieces to be connected, in particular between two pipe ends. At least one press seat can be provided on each of the shell elements for engagement with a pressing tool. The press seats can be arranged laterally on the press connector in such a way that a press tool with a distance between its press sections that is smaller than the pipe diameter can press the press connector.

In a further embodiment of the pressing tool, the at least two pressing sections are designed to be movable relative to one another, the relative movement being restricted by a certain minimum distance between the pressing sections and the minimum distance being determined as a function of a press connector to be pressed. In this way, a press connector can be pressed as intended and, in particular, excessive pressing that could lead to damage to a connection to be made can be avoided.

According to the invention, the above-mentioned object is also solved by a method for producing a tight connection of a press connector to a workpiece, in particular to a pipe made of a flexible material, preferably a plastic pipe, in which a hydraulic pressure is output at a pressure generation point, in which the hydraulic pressure is transmitted from the pressure generating location to a pressing location remote from the pressure generating location, and in which the hydraulic pressure is taken up at the pressing point and a press connector is pressed accordingly, in which, prior to the output of a hydraulic pressure a press connector is inserted at an interface between two pipe ends, a pressing tool is pre-tensioned and the pressing tool is inserted and released at the press connector, wherein the press connector is connected to a workpiece to be connected in a twist-proof manner by releasing the clamping force of the pressing tool.

The time required for joining plastic pipe ends using the method according to the invention is lower than with known procedures. In particular, compared to welding, there is no need to peel the PE pipe to be joined and there is no need for heating, holding and cooling times.

Furthermore, it has been found in the context of the present invention that the service interval from service to service is longer with the welding method according to the invention than with the known welding methods. The welding devices are thus serviced more often than the described tool.

In a preferred embodiment of the method, a first lifting force is generated at the pressure generation point and is translated into a hydraulic pressure, and in which the hydraulic pressure is translated into a second lifting force at the pressing location and the second lifting force is used to press a press connector, wherein the hydraulic pressure is transmitted from the pressure generation point to the injection point via a pressure transmission connection made of flexible material.

This allows the location where the first lifting force is generated and the location where the second lifting force is applied to be remote from each other. Furthermore, known, readily available and inexpensive means can be used to transmit a hydraulic pressure from the pressure generation location to the pressing location.

In a further embodiment of the method, the method steps "outputting a hydraulic pressure at the pressure generation point" and "transferring the hydraulic pressure from the pressure generation point to the pressing point" are repeated several times until a press-fitted state of the press-fit connector as intended is achieved.

Thus, by repeated actuation or by repeating manually surmountable movements, sufficient pressure can be generated to subsequently exert a sufficient lifting force on the press connector and to press it as intended. For example, by several small actuations of a pressing hand tool of the pressing tool, a force sufficient in total for the intended pressing can be exerted without the entire force having to be generated at once. This design is also advantageous when using a battery-powered hand tool. Furthermore, it can be ensured that a press connector to be pressed has been pressed sufficiently to guarantee a tight connection.

Preferably, the minimum number of repetitions is determined as a function of the press connector to be pressed and/or of at least one property of the pressing tool. In particular, a diameter of the press connector or a volume of a pressure chamber of the press tool can be taken into account when determining the minimum number.

In a further embodiment of the method, the output of a hydraulic pressure is inhibited or prevented when a predetermined limit value for the total lifting force exerted on the press connector is exceeded. In this way, it is possible to avoid exerting too high a lifting force on a press connector to be pressed, which could lead to damage to the press connector and thus to the connection to be made.

Preferably, the predetermined limit value is determined as a function of the press connector to be pressed and/or of at least one property of the pressing tool. In particular, a diameter of the press connector or a volume of a pressure chamber of the press tool can be taken into account when determining the limit value.

Further, the output of a hydraulic pressure may be inhibited or prevented by disconnecting a coupling between a press hand tool and a press force translator. Further, the prevention or inhibition may be indicated.

Before a hydraulic pressure is applied, a press connector is inserted at an interface between two pipe ends, a press tool is pre-tensioned and the press tool is inserted at the press connector and released, whereby the press connector is connected to a workpiece to be connected in a twist-proof manner by releasing the press tool.

This allows a user to position the pressing tool to the pressing connector at the pressing location and then move to the pressure generation location before pressing takes place.

Preferably, the pressing tool is then connected to the pressure tool via a pressure transmission connection. Furthermore, the output of a hydraulic pressure takes place in the connection. This allows the pressing tool to be applied to a press connector to be pressed or to be positioned on the press connector as intended and then connected for a drive. This makes it easier to install the pressing tool in pressing locations that are difficult to access.

BRIEF DESCRIPTION OF THE DRAWINGS

The previously described features of the system, the press force translator, the press tool and the process apply to the system, to the press force translator, to the press tool as well as to the process. In addition, the individual features can be combined with each other. Further features and advantages of the present invention will be apparent from the following description of several examples of embodiments, reference being made to the accompanying drawing. The drawing shows FIG. 1 a system for producing a tight connection between a press connector and a workpiece;

FIG. 8 the press connector and the press tool from FIGS. 3a to 7 in a third state;

FIG. 9 the press connector and the press tool from FIGS. 3a to 8 in a fourth state and FIG. 10 the press connector and the press tool from FIGS. 3a to 9, whereby the press tool is released.

DESCRIPTION OF THE INVENTION

Figure 1:
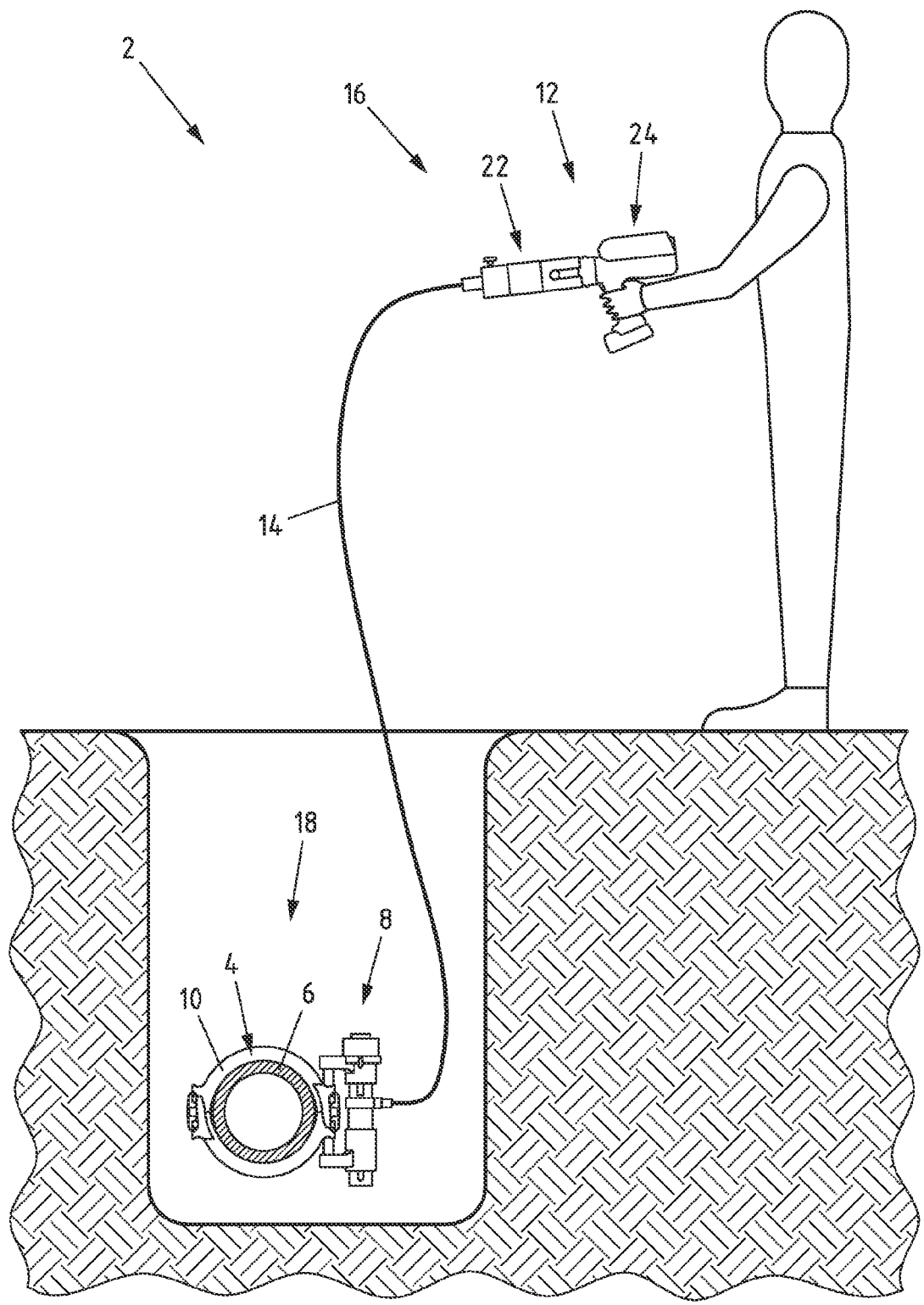

FIG. 1 shows a system 2 for producing a sealed connection between a press connector 10 and a workpiece 4 in the form of a pipeline 6 made of plastic. The system 2 has a pressing tool 8 for pressing the press connector 10 and a pressure tool 12 for driving the pressing tool 8. The compression connector 10 is attached to the pipeline 6 and the compression tool 8 is attached to the compression connector 10. The pressure tool 12 is designed as a hand tool and is connected to the pressing tool 8 via a pressure transmission connection 14. The place where the pressure tool 12 is located is referred to below as the pressure generation location 16 and the place where the pressing tool 8 is located is referred to as the pressing location 18.

The pressure generation point 16 and the injection point 18 are distant from each other, both in terms of height and horizontally.

The pressure tool 12 is formed as a hand tool 20 and has a pressing force translator 22 and a pressing hand tool 24. The pressure transmission connection 14 is at least partially made of flexible material.

In the following, the pressing force translator 22 of the pressing tool 12 and the pressing tool 8 as well as their mode of operation are explained in more detail.

Figure 2:
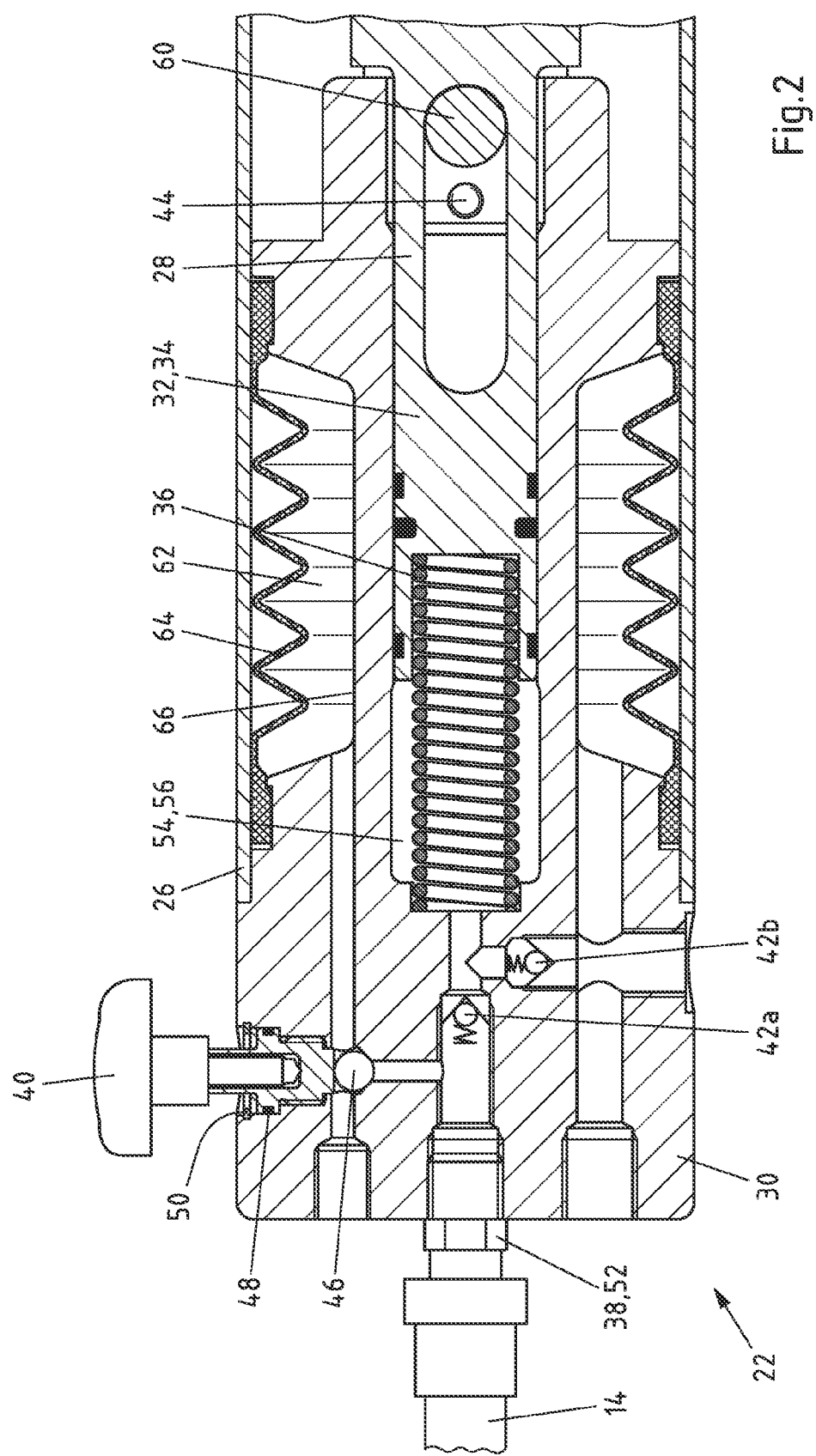
FIG. 2 a press force translator as part of a pressure tool of a system.

FIG. 2 shows a press force translator 22 as part of a press tool 12 of a system 2. The press force translator 22 has a housing 26, a connecting section 28 for receiving a lifting force and for connection to a press hand tool 24, a valve block 30, a pump plunger 32 as a translation means for 34 translating a received lifting force into a hydraulic pressure, a compression spring 36, a connecting member 38 for outputting a hydraulic pressure, a check valve 40 and two check valves 42a, 42b.

To produce the press force translator 22 shown in FIG. 2, the pump plunger 32 is pushed into the valve block 30 together with the compression spring 36 and secured with a grub screw 44. Then check valves 42a, 42b are screwed into holes provided for this purpose. Subsequently, the stop valve 40, which has a ball bearing ball 46 and which is sealed at one end by a sealing element 48, is mounted and secured by a circlip 50. On one outlet side of the valve block 30, a flat-face connection 52 is fitted for connection to a hydraulic hose 14. Further bores of the valve block 30 are sealed by means of VSTI screw connections ("sealing plugs for screw-in holes").

The valve block 30 has an interior 54 in which the pump plunger 32 can be moved in a forward direction and in an opposite reverse direction. An area 56 of the interior 54 left free by the pump plunger 32 is provided for receiving oil. The volume of this area varies with the position of the pump plunger 32 in the interior 54.

The press force translator 22 is connected to a press hand tool 24 (not shown in FIG. 2). For this purpose, the press force translator 22 is connected to the press hand tool 24 on one side of the valve block via the connecting section 28, whereby the connecting section 28 is arranged opposite the end of the valve block which has the flat-face connection 52. The connection between the connecting section 28 and the press hand tool 24 is made via a locking pin 60.

The pressure transmission connection 14 is connected to the other end of the pressing force translator 22, which is connected to the pressing tool 8 at the other end.

Activating the pressing hand tool 24 pushes the pump plunger 32 axially into the valve block 30. This movement displaces oil located in the valve block 30 or in the interior 54 so that the oil flows through the check valve 42a and the flat-face connection 52 into the pressure transmission connection 14 to then enter the pressing tool 8. The check valve 42a restricts the flow of oil during a movement of the pump ram 32 towards the flat-face connection 52. In addition, the manually operated check valve 40 is tightly closed during the entire pressing process.

As soon as the movement of the part of the pressing tool 24 connected to the pump plunger 32 or to the connecting section 28 has been completed, i.e. in the state as shown in FIG. 2, the pump plunger 32 moves out of the valve block 30 by the spring force of the compression spring 36. At this point, the check valve 42a blocks a backflow of oil into the interior 54 of the valve block 30, so that the hydraulic pressure generated during the forward movement of the pump plunger 32 in the direction of the pressing tool 8 remains in the pressure transmission connection 14.

When the pump plunger 32 is moved back, i.e. when the pump plunger 32 is extended out of the valve block 30 in the direction of the press hand tool 24, a negative pressure is created in the interior 54, which causes the check valve 42b to open. This allows oil, originally located in a space 62 between a bellows 64 and an outer portion 66 of the valve block 30, to flow into the interior 54 through the bore in which the check valve 42b is located. When the pump plunger 32 is extended, the inner chamber 54 is filled with oil again and the stroke of the pump plunger 32 is completed.

After reaching a predetermined maximum operating pressure in the inner chamber 54, the shut-off valve 40 can be opened manually so that oil flows out into the intermediate chamber 62 under pressure relief. Preferably, the maximum operating pressure is reached after three strokes of the pump plunger 32. However, an oil volume designed for more than three strokes may be provided so that further pressing hand tools with a higher oil requirement can be used if necessary. The hydraulic hose is supplied pre-filled with a predetermined volume of oil so that air bubbles in the hydraulic system can be avoided. The oil remains in the line until the hose is connected, only then does the Flat-Face coupling release the oil.

Figure 3A:
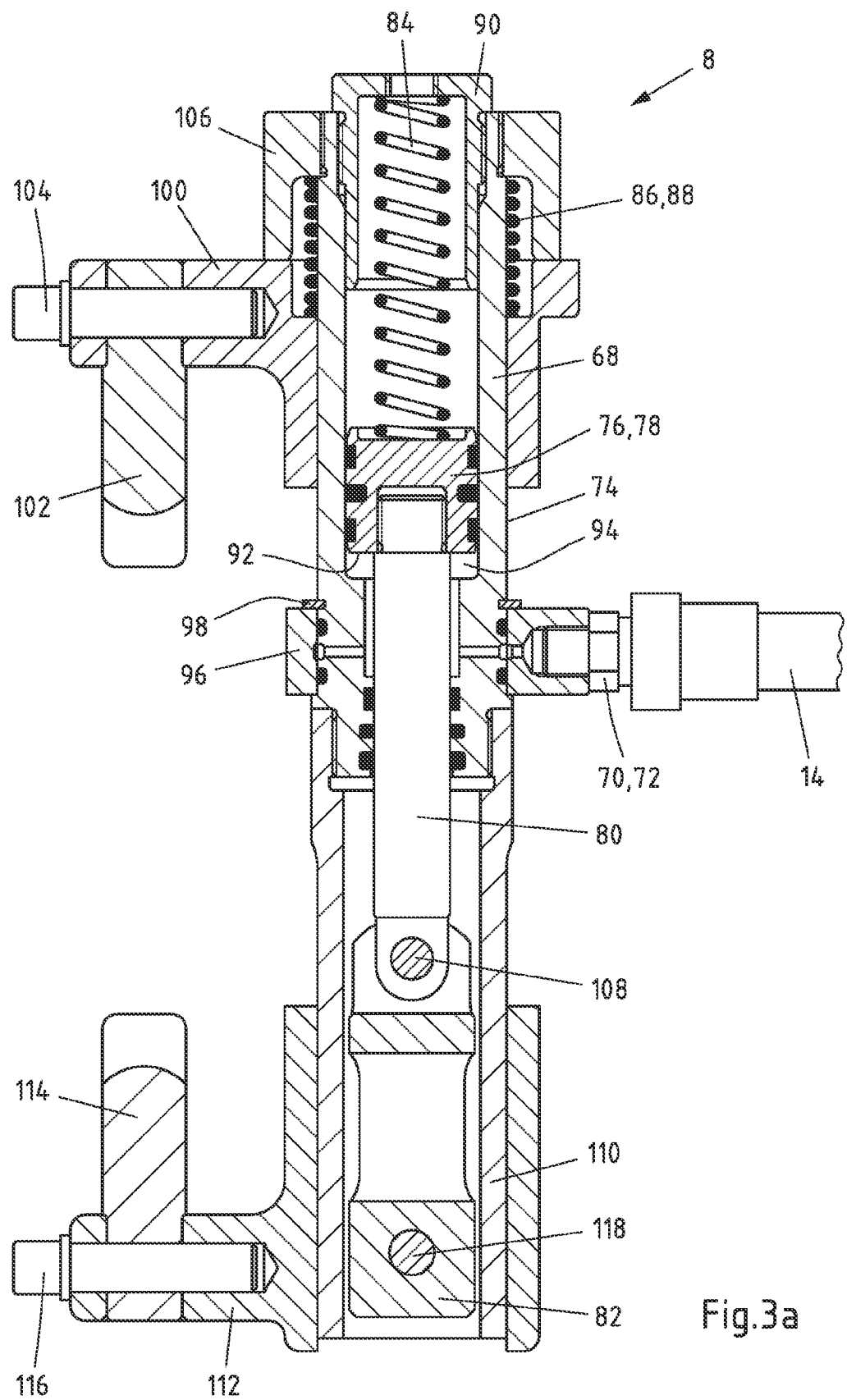
FIG. 3a a pressing tool in a first state, in a lateral sectional view.

FIG. 3a shows a pressing tool 8 in a lateral sectional view. The pressing tool 8 has, among other things, a housing 68, a flat-face connection 70 as a connecting element 72 for receiving a hydraulic pressure, a cylinder tube 74, transmission means 78 in the form of a piston 76, a piston rod 80, a joint piece 82, a compression spring 84 and a pretensioning spring 86 as a pretensioning element 88 for pretensioning the pressing tool 8.

To produce the pressing tool 8 shown in FIG. 3a, the piston rod 80, which is screwed to the piston 76, is inserted into the cylinder tube 74 together with the compression spring 84. To close the cylinder barrel, 74a cover 90 is attached or screwed to a distal end of the cylinder barrel 74. A space in the cylinder barrel 74, located around the piston rod 80 and partially restricted by the base 92 of the piston 76 forms a hydraulic chamber 94.

Then a connection ring 96 with mounted flat-face connection 70 is pushed over the cylinder barrel 74 as far as it will go and secured with a circlip 98. The connection ring 96 can be rotated through 360° and has two O-rings and for sealing its connection with the cylinder tube 74. Then a first cantilever arm 100 with a first press section 102 and a bolt 104 is pushed over the cylinder barrel 74.

Next, the preload spring 86 is attached. For this purpose, the preload spring 86 is screwed to the cylinder tube 74 with a stop element 106. Next, the joint piece 82 is connected to the piston rod 80 by means of a bolt 108. In the next step, a sleeve 110 is screwed to the cylinder barrel 74. Lastly, a second cantilever 112 with a second press section 114 and a bolt 116 is slid over the sleeve 110 and connected to the joint piece 82 by means of a bolt 118, so that the first press section 102 of the first cantilever 100 and the second press section 114 of the second cantilever 112 are arranged opposite each other.

FIG. 3a shows the pressing tool 8 in a state in which the pressing sections 102, 114 are at a predetermined distance from each other.

Figure 3B:
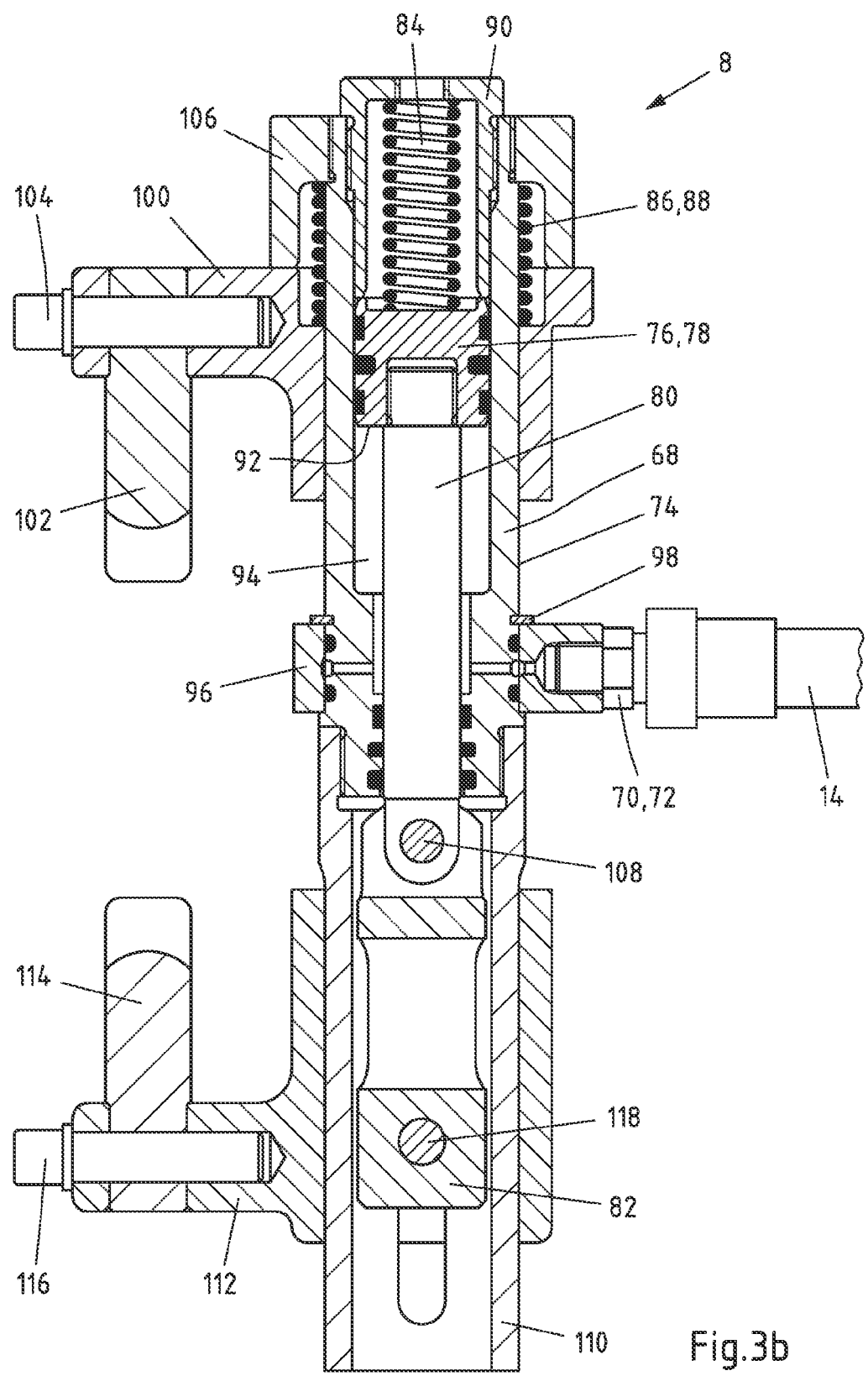
FIG. 3b the pressing tool from FIG. 3a in a further (third) state, in a lateral sectional view.

FIG. 3b shows the pressing tool 8 in a state in which the pressing sections 102, 114 have a smaller distance to each other. Oil, which is in the hydraulic chamber 94, presses on the bottom 92 of the piston 76 in the direction of the cover 90. In its movement, the piston 76 drives the piston rod 80 and thus the joint piece 82 and the second cantilever arm 112 with the second pressing section 114 in the direction of the first pressing section 102. The stop element 106 restricts the axial movement of the first pressing section 88, so that during pressing the second pressing section 114 presses a press connector to be pressed against the first pressing section 102.

Figure 4:
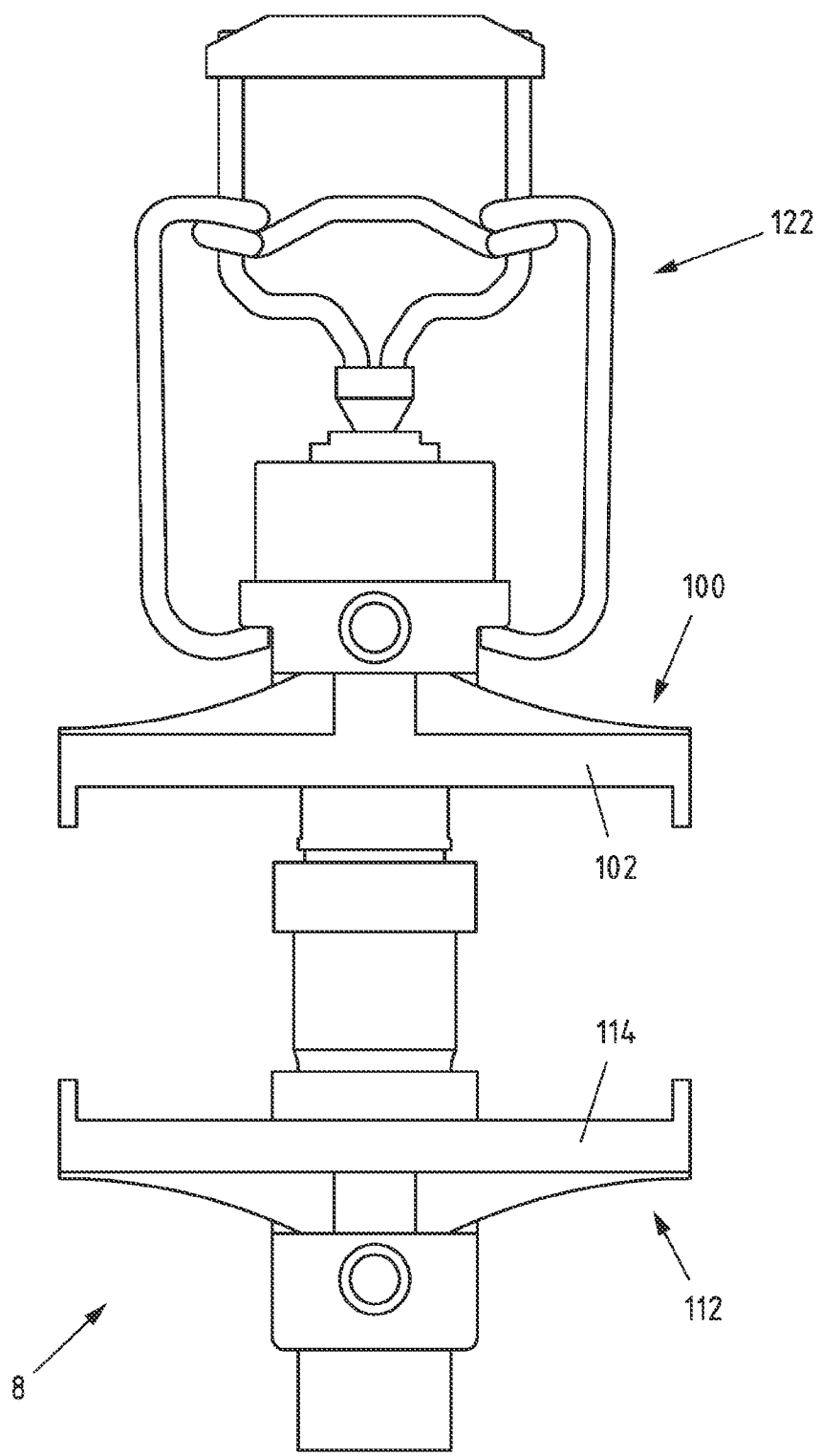
FIG. 4 a side view of the pressing tool from FIGS. 3a and 3b.

FIG. 4 shows a side view of the pressing tool 8, wherein a pre-tensioning handle 122 is provided. The pretensioning handle 122 is adapted to be used as a transport handle for the pressing tool 8 and can be tightened manually. Pulling the pretensioning handle 122 causes compression of the pretensioning spring 86.

The pressing tool 8 can be used as follows.

First, the pressing tool is brought into a first state shown in FIG. 3a. For this purpose, the pretensioning spring 86 is tensioned or compressed, if necessary by tightening the pretensioning handle 122. Then the press sections 102, 114, thus moved apart, are brought into engagement with a press connector 10 by at least partially relaxing the pretensioning spring 86, as explained in more detail in connection with FIGS. 5 to 10. By releasing the pretensioning spring 86 or, if applicable, by releasing the pretensioning handle 122, the press sections 102, 114 grip the press connector 10 with a pretensioning force corresponding to the spring constant of the pretensioning spring 86, so that the press tool is in a second state.

In a next step, the pressing tool is brought into a third state, which is shown in FIG. 3b. For this, an oil displaced by the press force translator 22 is directed through the flat-face connection 52 via the connection ring 96 to the hydraulic chamber 94 in the cylinder tube 74. The oil transmits a hydraulic pressure to the bottom 92 of the piston 76 and moves it in the direction of the cover 90 of the cylinder tube 74 against the force of the compression spring 84 with a corresponding lifting force. The piston 76 drives the piston rod 80 with the lifting force corresponding to the hydraulic pressure exerted on the piston 76. The movement of the piston rod 80 causes a movement of the joint piece 82, which in turn drives the second cantilever 112. Thus, the second cantilever 112 is moved together with the second pressing section 114 in the direction of the first pressing section 102 and thus the press connector 10 is pressed.

Figure 5:
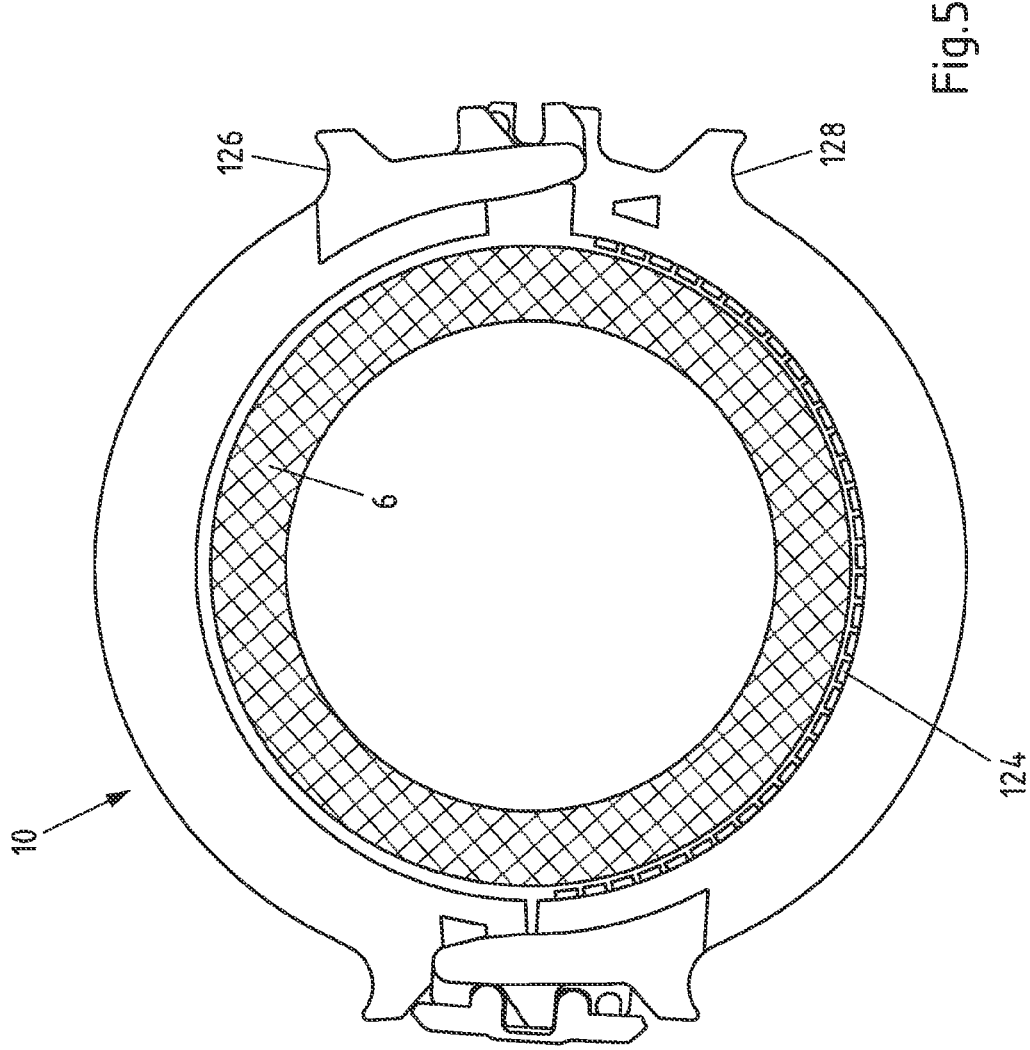
FIG. 5 an example of a press connector attached to a pipeline in an unpressed, non-pretensioned state.

FIGS. 5 to show 10 the successive states that a press tool 8 described above assumes when carrying out a process for producing a sealed connection of a press connector to a workpiece, and the corresponding effect on a press connector 10.

FIG. 5 shows an initial situation in which a press connector 10 with a cutting half-ring 124 is attached to a pipeline 6, but is neither pretensioned nor pressed.

Figure 6:
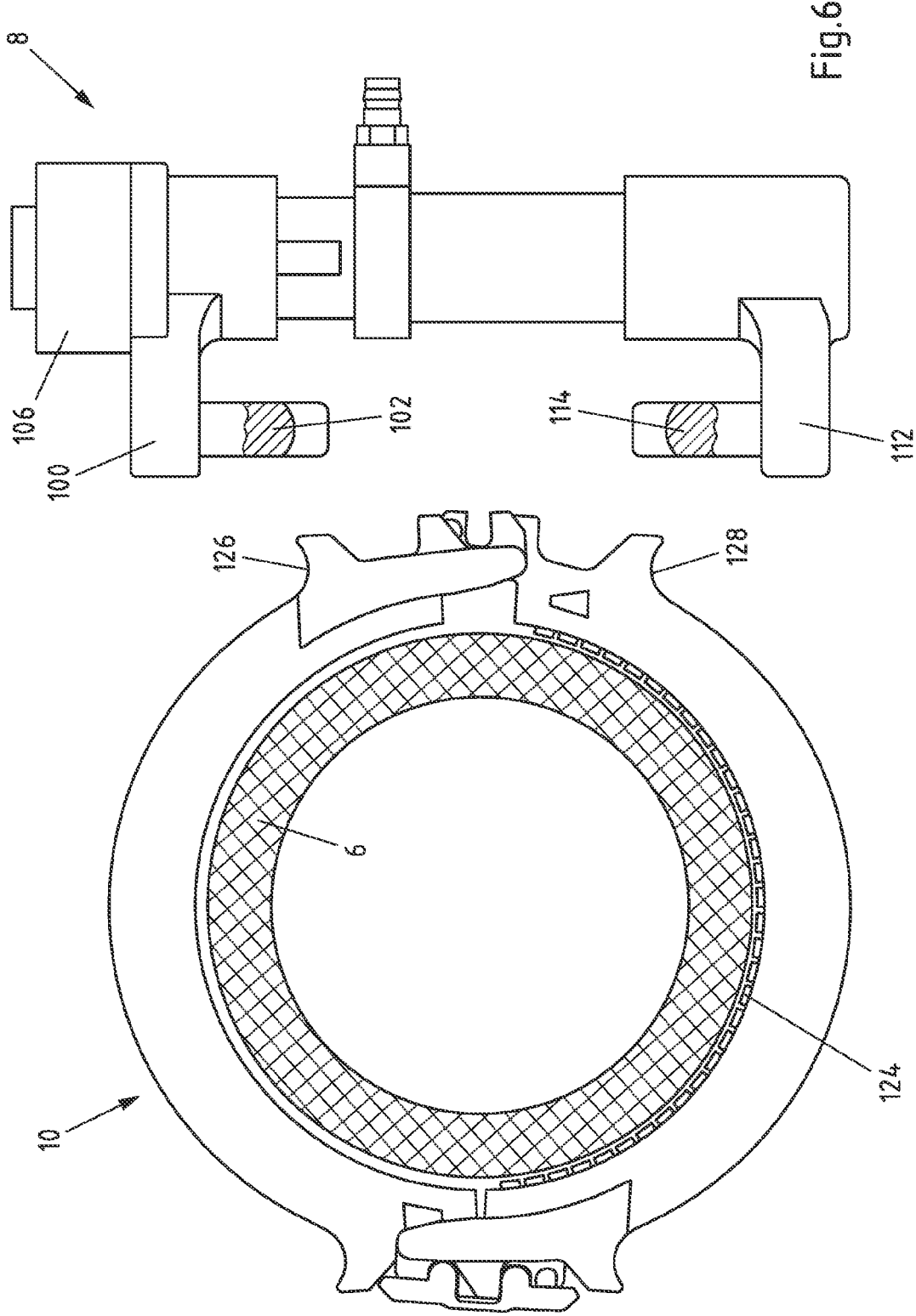
FIG. 6 the press connector from FIG. 5 and the press tool from FIGS. 3a to 4 in the first state.

In FIG. 6 the pressing tool 8 is in the first state. The pressing tool 8 is pretensioned, possibly by pulling a pretensioning handle 122, and the pressing sections 102, 114 are moved apart. The pressing sections 102, 114 are moved away from each other to such an extent that the cantilever arm 100, which supports the pressing section 102, abuts against the stop element 106. Pulling the pretensioning handle 122 or tightening the pretensioning element 88 produces a predefined pretensioning force. The press connector 10 is further neither preloaded nor pressed.

Figure 7:
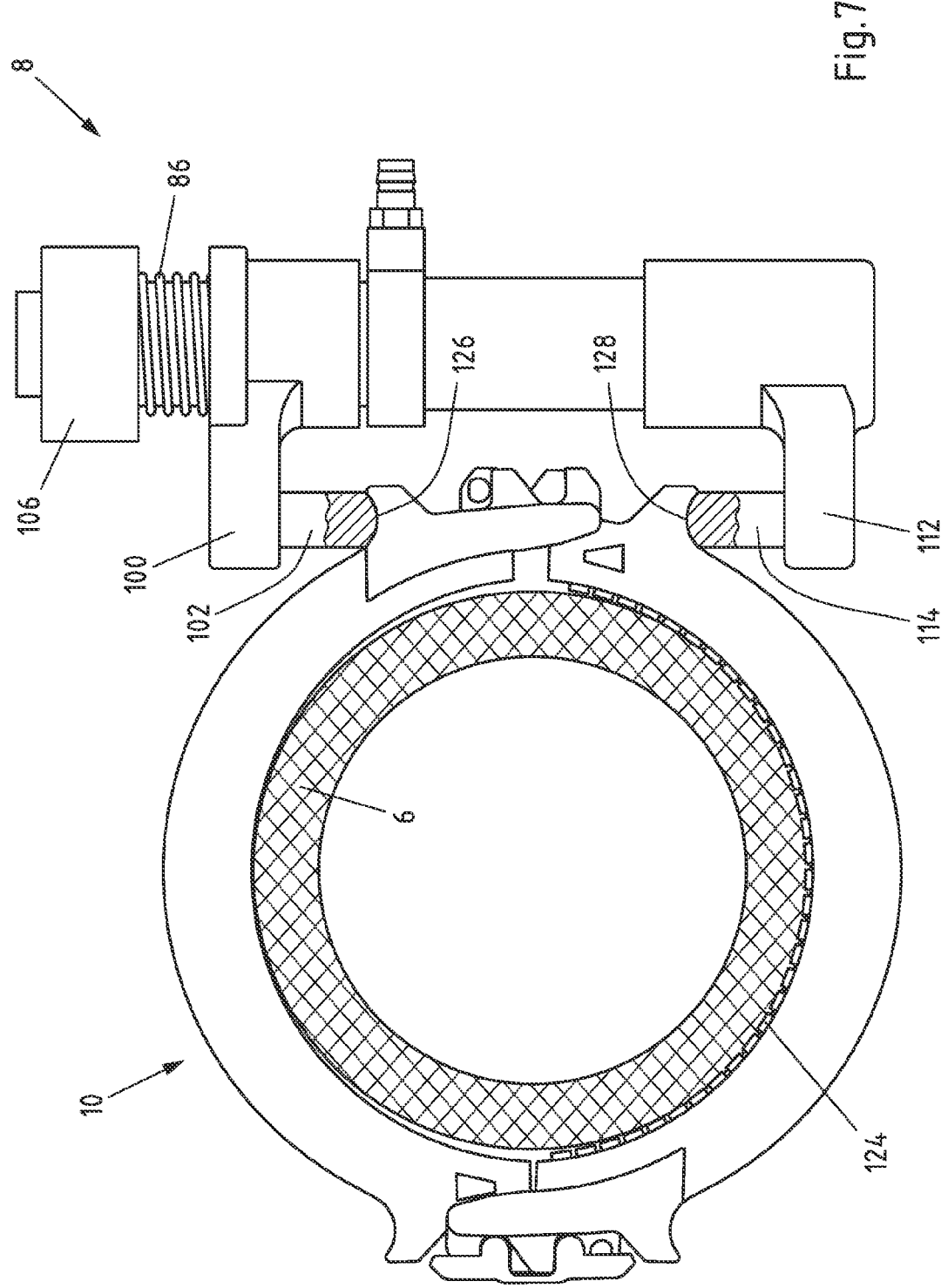
FIG. 7 the press connector and the press tool from FIGS. 3a to 6 in a second state.

FIG. 7 shows the pressing tool 8 and the press connector 10 in the second state. The pretensioning element 88 of the pressing tool 8 is relaxed, the pretensioning handle 122 has been released if necessary. During relaxation, the first cantilever arm 100 together with the first pressing section 102 has moved in the direction of the second pressing section 114, so that the distance between the pressing sections 102, 114 is smaller than in the state shown in FIG. 6. The press sections 102, 114 are each engaged with an interference fit 126, 128 of the press connector 10. Due to the spring force of the pretensioning element 88, the press connector 10 is partially compressed and the press tool 8 remains in engagement with the press seats 126, 128. The cutting collar 124 of the press connector 10 penetrates the surface of the pipeline 6 so that the press connector 10 is attached to the pipeline 6 in an anti-rotational manner. As a result, the press connector 10 is pre-tensioned but not pressed.

The pressing tool 8 is then connected to the pressing force translator 22 of the pressing tool 12 via a hydraulic hose as a pressure transmission connection 14 with a flat-face connection.

FIG. 8 shows the pressing tool 8 and the press connector in the third state. Here, the pressing tool 8 receives hydraulic pressure from the pressing tool 12 through its flat-face connection 70 and translates this pressure into a lifting force. The pressing tool 8 exerts the lifting force through the pressing sections 102, 114 onto the respective press fit 126, 128 of the press connector 10. Thus, the press connector 10 is pressed.

In FIG. 9, the pressing tool 8 exerts sufficient lifting force on the press connector 10 to press the press connector 10 as intended. In the intended pressed state, sealing elements of the press connector 10, which are arranged on the inner surface of the press connector 10, are pressed against the outer wall of the pipeline 6. As a result, the press connector 10 lies tightly against the pipeline 6 A securing element 130 has been attached to the press connector 10, which holds the press connector 10 in the pressed state. Thus the press connector 10 is pressed and secured. Thus the pressing tool 8 and the press connector 10 are in a fourth state.

The securing element 130 can be pushed laterally onto the press connector 10. Preferably, the securing element can be pushed with one hand.

In FIG. 10 the press connector 10 is pressed and secured. The pressing tool 8 no longer exerts a lifting force on the press connector 10. Furthermore, the pressing tool 8 is clamped, if necessary by pulling the pretensioning handle 122, so that the pressing sections 102, 114 are moved away from each other. In this state, the pressing tool 8 can be easily removed or released from the press connector 10. Alternatively, after pressing, the pressing tool 8 can be removed from the connector 10 without re-tensioning.

In the following, a use of system 2 is described as an example.

First, a first lifting force is translated into a hydraulic pressure by means of the pressure tool 12 and transmitted to the pressing tool 8 via the pressure transmission connection 14. Then the pressing tool 8 takes up the hydraulic pressure and translates it into a corresponding second lifting force. The second lifting force is sufficient to counteract or overcome the force of the pre-tensioning spring 86 and to move the first cantilever arm 100 up to the stop element 106.

Subsequently, the press connector 10 is pressed by a predefined minimum number of strokes at the pressing tool 12 or a predefined minimum number of actuations of the pressing tool 12. Over-pressing" by too many strokes is prevented by a limitation based on a predetermined distance between the pressing sections 102, 114 of the pressing tool. Accordingly, the pressing tool 12 or the pressing hand tool 24 of the pressing tool 12 switches off automatically when an operating pressure corresponding to the predetermined distance between the pressing sections 102, 114 of the pressing tool 8 is reached.

As soon as this operating pressure is reached and the finished pressing dimension of the press connector 10 or the predetermined distance between the pressing sections 102, 114 is reached, a locking element 130 can be inserted. Finally, the pressing tool 8 is opened by turning open the locking valve 40 on the pressing force translator 22. This allows the oil from the pressing tool 8 to flow back into the tank 64 via the pressure transmission connection 14 to the pressing force translator 22 through the open channel of the open shut-off valve 40.

The invention claimed is:

1. A system for producing a tight connection of a press connector to a workpiece, the system comprising:
   a pressing tool for pressing a press connector; and
   a pressure tool for driving the pressing tool,
   wherein the pressure tool is arranged to output a hydraulic pressure at a pressure generation location, wherein the pressing tool is arranged to receive a hydraulic pressure at a pressing location and to press a press connector accordingly, and wherein the pressure tool and the pressing tool are connected via a hydraulic pressure transmission connection, and
   wherein the pressure generation point and the injection point being remote from each other, wherein the pressing tool comprises at least two opposing pressing sections with a variable distance to each other and a pre-tensioning member, wherein the pressing tool is arranged to take at least three states, wherein in a first state the pre-tensioning member is tightened and the pressing sections are spaced apart, wherein, in a second state, the pressing sections are tightened by relaxing the pre-tensioning member into engagement with a press connector, wherein in a third state the press sections exert a lifting force towards each other on the press connector, and wherein in the second state, the press connector is connected in a twist-proof manner to a workpiece to be connected.

2. The system according to claim 1, wherein the pressure transmission connection is at least partially formed from a flexible material.

3. The system according to claim 1, wherein the pressure transmission connection comprises a hydraulic hose, and wherein the hydraulic hose is connected to the pressure tool and to the pressing tool.

4. The system according to claim 3, wherein the hydraulic hose is connected to the pressure tool and to the pressing tool in each instance via a flat-face connection.

5. The system according to claim 1, wherein the pressure tool is designed as a hand tool with a press hand tool and with a press force translator, wherein the pressing hand tool is arranged to generate and transmit a lifting force at the pressing force translator, and wherein the pressing force translator is arranged to translate a lifting force transmitted from the pressing hand tool into a hydraulic pressure and to output it.

6. The system according to claim 1, wherein the pressing tool is arranged to translate a pressure transmitted by the pressure transmission connection into a lifting force, and to press a press connector by exerting the lifting force.

7. The system according to claim 1, wherein the pressure tool is arranged to switch off when a limit value for the variable distance between the pressing sections of the pressing tool is reached.

8. The system according to claim 1, wherein the workpiece is a pipe.

9. The system of claim 1, wherein the workpiece is a plastic pipe.

10. A pressing tool for pressing a press connector, the pressing tool comprising:
    a housing;
    a connecting element for receiving a hydraulic pressure;
    a translation member designed to translate a received hydraulic pressure into a lifting force; and
    at least two pressing sections for pressing a press connector at a pressing location,
    wherein the connecting element is arranged for connection to a pressure transmission connection which is at least partially formed from flexible material, wherein a pre-tensioning member is provided for pre-tensioning the at least two pressing sections, wherein a pre-tensioning handle is provided for pre-tensioning the pre-tensioning member, and wherein, when the pre-tensioning member is pre-tensioned, the first pressing section is moved away from the second pressing section and, when the pre-tensioning member is released, the first pressing section is moved towards the second pressing section.

11. The pressing tool according to claim 10, wherein the at least two press sections are designed for lateral engagement with the press connector.

12. The pressing tool according to claim 10, wherein the at least two pressing sections are designed to be movable relative to each other, whereby the relative movement is restricted by a certain minimum distance of the pressing sections from each other, and wherein the minimum distance is determined as a function of the press connector to be pressed.

13. The pressing tool according to claim 10, wherein the pressing tool is designed for use in a system for producing a sealed connection with a workpiece.

14. The pressing tool according to claim 13, wherein the workpiece is a pipe.

15. The pressing tool according to claim 13, wherein the workpiece is a plastic pipe.

16. A method for producing a tight connection of a press connector to a workpiece, the method comprising the steps of:
    outputting a hydraulic pressure at a pressure generation point;
    transferring the hydraulic pressure from the pressure generating location to a pressing location remote from the pressure generating location; and
    taking up the hydraulic pressure at a pressing point in order to enable the press connector to be pressed accordingly,
    wherein prior to the output of the hydraulic pressure: a press connector is inserted at an interface between two pipe ends, a pressing tool is pre-tensioned and the pressing tool is inserted and released at the press connector, and wherein the press connector is connected to a workpiece in a twist-proof manner by releasing a clamping force of the pressing tool.

17. The method according to claim 16, in which a first lifting force is generated at the pressure generation point and is translated into a hydraulic pressure, and in which the hydraulic pressure is translated into a second lifting force at the pressing location and the second lifting force is used to press the press connector, wherein the hydraulic pressure is transmitted from the pressure generation point to an injection point via a pressure transmission connection made of flexible material.

18. The method of claim 16, the method further comprising repeating the steps of: outputting the hydraulic pressure at the pressure generating point; and transferring the hydraulic pressure from the pressure generating location to the pressing location remote from the pressure generation location, until the press connector is in an intended pressed state.

19. The method according to claim 16, wherein when a predetermined limit value for the total lifting force exerted on the press connector is exceeded, the output of the hydraulic pressure is inhibited or prevented.

20. The method according to claim 16, wherein the workpiece is a flexible pipe.

21. The method according to claim 16, wherein the workpiece is a plastic pipe.

\* \* \* \* \*